April 28, 1959  C. W. MacMILLAN  2,883,762
AUTOMOTIVE VEHICLE WHEEL ALIGNMENT GAUGE
Filed April 26, 1956  3 Sheets-Sheet 2
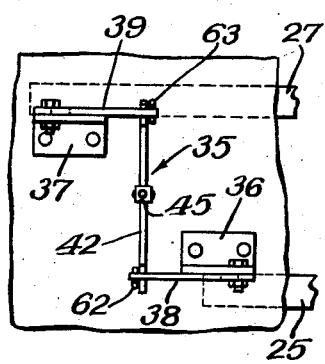
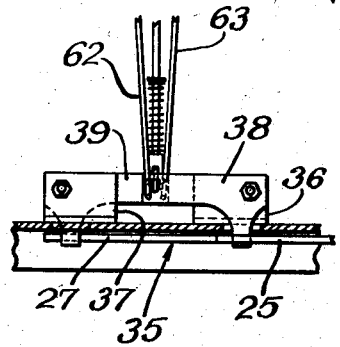
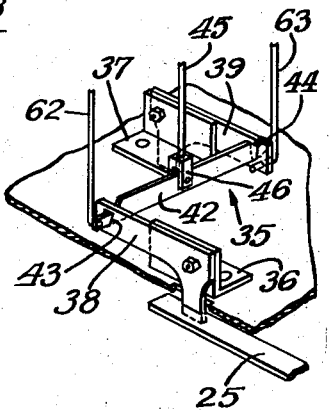
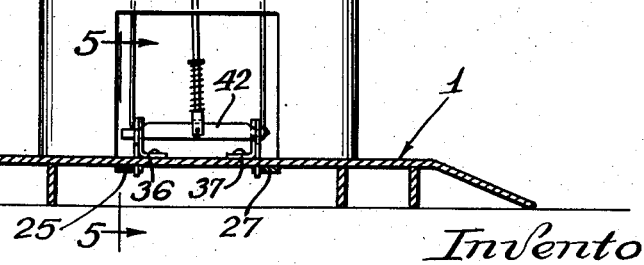
Inventor:
Charles W. MacMillan
By Gary, Desmond & Parker Attys.

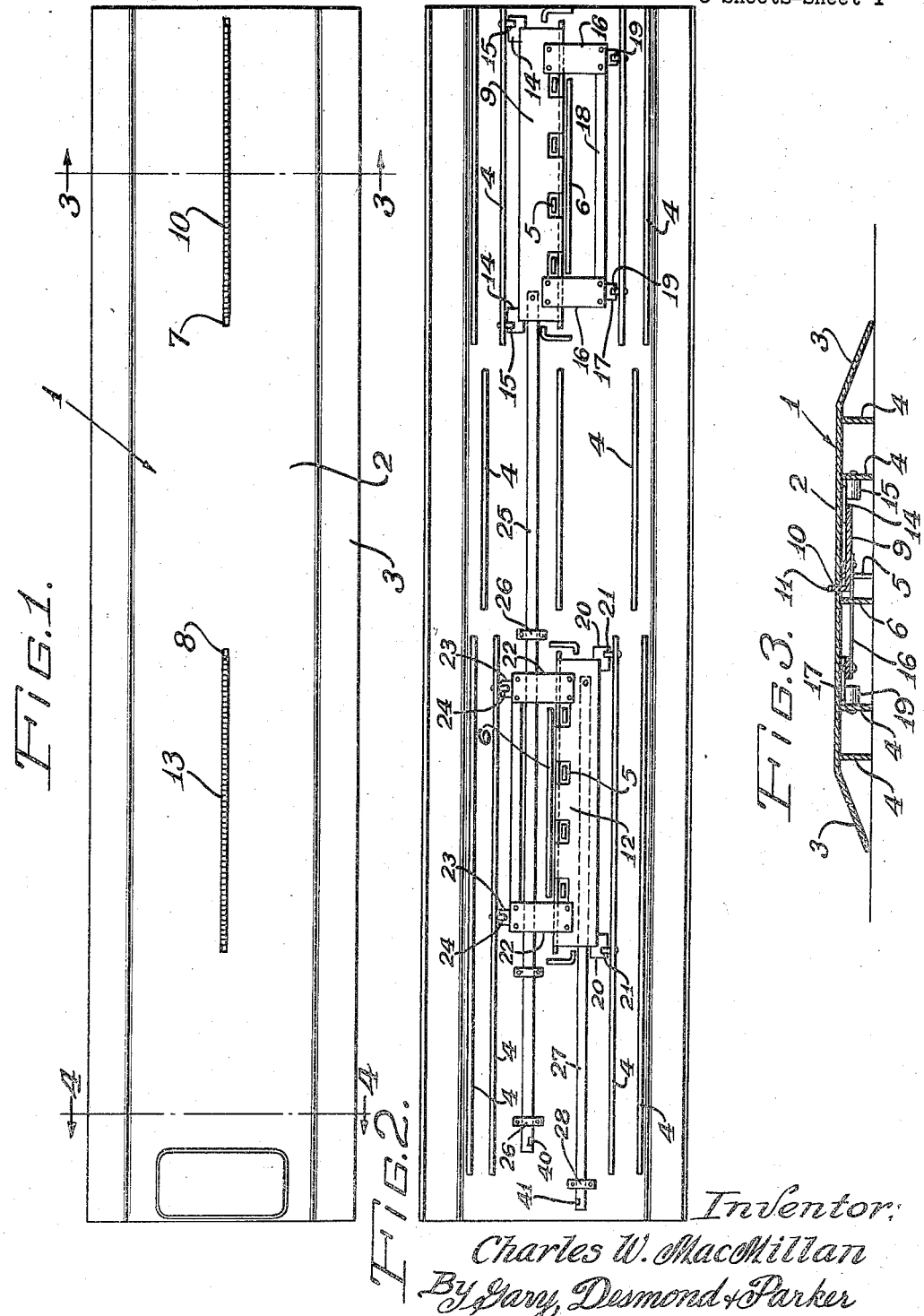

April 28, 1959 C. W. MacMILLAN 2,883,762
AUTOMOTIVE VEHICLE WHEEL ALIGNMENT GAUGE
Filed April 26, 1956 3 Sheets-Sheet 3

Inventor:
Charles W. MacMillan
By Gary, Desmond & Parker
Attys.

2,883,762
AUTOMOTIVE VEHICLE WHEEL ALIGNMENT GAUGE

Charles W. MacMillan, Rock Island, Ill., assignor to Bear Manufacturing Company, Rock Island, Ill., a corporation of Delaware Application April 26, 1956, Serial No. 580,826

4 Claims. (Cl. 33—203.14)

This invention relates to improvements in an alignment gauge for automobile wheels, and refers particularly to an alignment gauge of the type which detects and measures the lateral sliding or slippage of the tires relative to the pavement on a forwardly moving automobile.

One of the important features of the present invention resides in an alignment gauge of the type described which measures not only the differential or summation of lateral slip of opposite tires of an automobile but which measures the individual slip of each of the opposite tires.

Other objects and advantages of the present invention will be apparent from the accompanying drawings and following detailed description.

In the drawings,

Fig. 1 is a top plan view of the treadway over which the automobile is to be driven whereby the wheel alignment characteristics may be determined.

Fig. 2 is a bottom plan view of the treadway.

Fig. 3 is a transverse sectional view taken on line 3—3 of Fig. 1.

Fig. 4 is a front elevation of the measuring tower associated with the device, parts being shown in section as taken on line 4—4 of Fig. 1.

Fig. 5 is an enlarged detailed sectional view of the fulcrum bar employed in the device taken on line 5—5 of Fig. 4.

Fig. 6 is a top plan view of the device illustrated in Fig. 5.

Fig. 7 is a detailed perspective view of the mechanism shown in Figs. 5 and 6.

Figure 8:
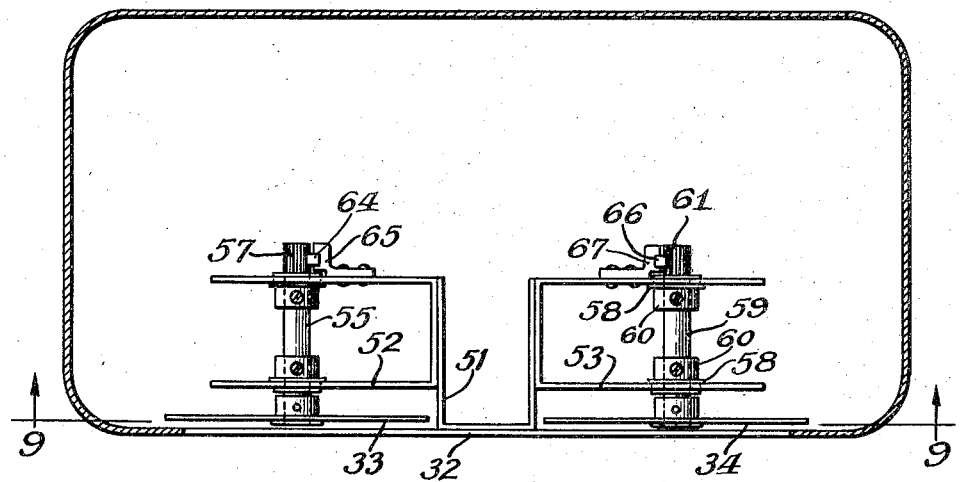
Fig. 8 is an enlarged sectional view taken on line 8—8 of Fig. 4.

Referring in detail to the drawings, 1 indicates a treadway or treadplate which comprises an elongated flat platform portion 2 having inclined longitudinal edge portions 3, 3 whereby an automotive vehicle may conveniently pass over the treadway from either lateral side. The platform 2 is supported by a plurality of spaced longitudinally extending ribs 4 and a plurality of longitudinally spaced supports 5 and adjacent ribs 6 which are laterally spaced from the supports 5. As will be hereinafter more fully described the supports 5 acting with the adjacent ribs 6 function as guides for some of the moving parts of the alignment gauge to be hereinafter more fully described.

The treadway platform portion 2 is provided with two aligned axially spaced elongated apertures or slots 7 and 8. A movable plate 9 is positioned upon the lower face of the platform portion 2 and carries an elongated flange 10 which extends through slot 7, the upper edge of the flange being serrated or carrying teeth 11. Similarly, a plate 12 is positioned beneath the platform portion 2 adjacent slot 8, said plate carrying a flange 13 which extends through slot 8, said flange having its upper protruding edge serrated similar to serrations or teeth 11 on flange 10.

A pair of supporting lugs 14, 14 are carried in spaced relationship upon plate 9, said lugs being adapted to be carried, and roll upon, rollers 15 mounted upon a rib 4. The plate 9 also carries a pair of spaced laterally extending members 16, 16 upon each of which is mounted a supporting lug 17, the members 16 being connected together by means of a brace bar 18. Rollers 19 are mounted upon a rib 4 and are adapted to support the spaced lugs 17.

Thus, plate 9 is mounted beneath the platform portion for longitudinal movement thereunder, said movement being restricted by the relationship of flange 10 in slot 7 and also by supports 5 and rib 6 which are disposed on opposite sides of the flange 7.

In similar fashion a pair of supporting lugs 20 are mounted in spaced relationship to each other upon plate 12, said lugs being adapted to be supported by rollers 21 carried upon an adjacent rib 4. Members 22 are carried upon the opposite lateral side portion of plate 12 and at their respective ends said members carry supporting lugs 23 which are adapted to be mounted or supported by rollers 24 carried upon an adjacent rib 4.

Thus the plate 12 is mounted for limited longitudinal movement beneath the platform portion 2, the movement being guided by supports 5 and rib 6 which are positioned on opposite sides of the flange 13. A connecting bar 25 is secured at one end to the plate 9, said bar extending longitudinally beneath the treadway. The bar 25 is adapted to be axially moved by plate 9 and such movement is guided by the lugs 26 mounted upon the lower face of the platform portion 2. A connecting bar 27 is secured at one end to plate 12 and is adapted to be moved by said plate, the movement being guided by the bracket 28.

An upwardly extending casing or indicating tower 29 is mounted upon one end portion of the treadway 1, said tower being provided, adjacent its upper end, with a window opening 30. A transparent window is carried over opening 30 and said window carries a scale 31 which is visible from the exterior of the tower.

The tower 29 is also provided with an intermediate opening 32 through which portions of the faces of two calibrated dials 33 and 34 are visible.

As will be hereinafter more fully described, the total or summation of the movements of plates 9 and 12 are read upon scale 31 and the individual movements of plates 9 and 12 are respectively indicated by dials 33 and 34.

Positioned beneath the platform portion 2 and beneath tower 29 is a fulcrum mechanism 35, shown best in detail in Figs. 5, 6 and 7. The mechanism 35 comprises a pair of spaced angle iron supports 36 and 37 which are mounted upon the upper face of the platform portion 2, angle iron support 36 being offset inwardly relative to the treadway 1 from angle iron support 37. A bell crank lever 38 is pivotally secured to support 36 and a similar bell crank lever 39 is pivoted upon support 37. Connecting bar 25, adjacent its end, is provided with a notch 40 which engages with one end of bell crank lever 38 and connecting bar 27 is similarly provided with a notch 41 which engages with an end of bell crank lever 39, the ends of said levers engaged by said bars protruding downwardly through apertures provided in the platform portion 2 of the treadway.

A transverse lever 42 engages in apertures 43 and 44 provided in levers 38 and 39, respectively, the apertures being so formed in conjunction with the end portions of lever 42 to provide frictionless knife-edge engagement.

The arrangement is such that when plates 9 and 12 move longitudinally levers 38 and 39 are rocked about their respective pivots and lever 42 is rocked and/or moved upwardly or downwardly.

A rod carrying a clevis 46 at its end is pivotally connected to the central portion of the transverse lever 42 and at its opposite end is connected by means of coupling 47 to an offset portion 48 of a pointer 49. A supporting lug 50 is secured to a wall of the tower 29 and pointer 49 is pivotally mounted upon said lug. The arrangement is such that when the central portion of the transverse lever is raised or lowered by the movement of bars 25 and 27, the pointer 49 is rocked about its pivotal connection with lug 50 and the displacement of the end of the pointer may be read upon scale 31.

Figure 9:
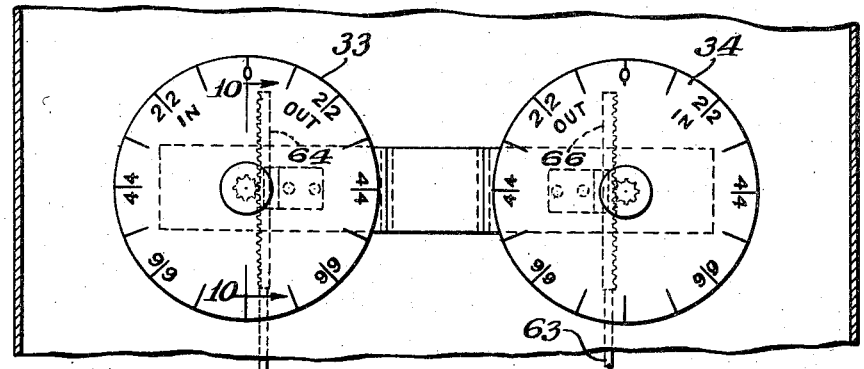
Fig. 9 is a sectional view taken on line 9—9 of Fig. 8.
Figure 10:
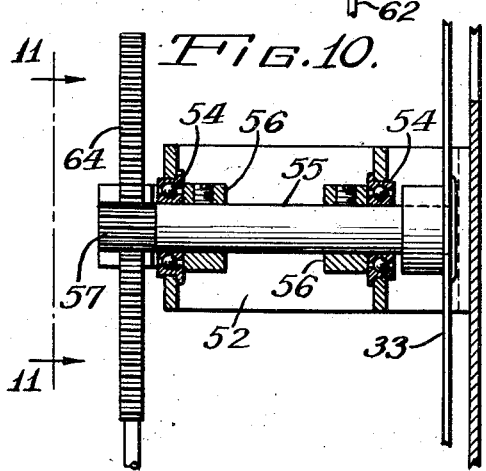
Fig. 10 is an enlarged detailed sectional view taken on line 10—10 of Fig. 9.
Figure 11:
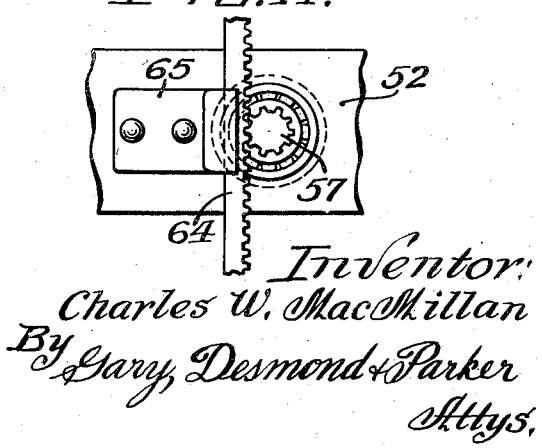
Fig. 11 is a detailed view looking in the direction of the arrows 11—11 of Fig. 10.

Referring particularly to Figs. 8, 9, 10 and 11, a U-shaped bracket 51 is mounted upon the inner side of a wall of the tower 29 immediately beneath the opening 32. To the opposite legs of the bracket 51, U-shaped brackets 52 and 53 are respectively secured. Each leg of bracket 52 is provided with an opening, the openings being aligned with each other and each opening carrying a ball bearing assembly 54. A shaft 55 is journaled in bearings 54, and carries at one end, the dial 33. Collars 56 are mounted upon shaft 55 between the legs of the bracket 52 to prevent axial movement of the shaft in bearings 54. The opposite end of shaft 55 carries pinion 57 which, when actuated, rotates the dial 33.

In similar fashion bearings 58 are carried by the bracket 53 and a shaft 59 is journaled in said bearings, collars 60 being mounted on said shaft to prevent axial movement thereof. At one end of shaft 59 the dial 34 is mounted and at the other end thereof a pinion 61 is carried whereby the shaft and dial may be rotated.

A rod 62 is pivotally connected at one of its ends to an end of the transverse lever 42 adjacent lever 38. A similar rod 63 is pivotally connected to the opposite end of the transverse lever 42 adjacent lever 39. A rack 64 is secured to the opposite end of rod 62 and engages pinion 57, said rack being guided for axial movement in mesh with pinion 57 by means of guide 65 carried by bracket 52. A rack 66 is connected to the opposite end of rod 63 and meshes with pinion 61, said rack being guided by guide 67 mounted upon bracket 53.

The arrangement is such that when the transverse lever 42 rocks about its connection with rod 45, rods 62 and 63 will be moved either upwardly or downwardly and, hence, racks 64 and 66 will move upwardly or downwardly thereby rotating shafts 55 and 59 and dials 33 and 34. An index 68 is inscribed upon a transparent closure for aperture 32 whereby the indicia carried by dial 33 may be read and an index 69 is also inscribed upon said transparent closure whereby the indicia carried by dial 34 may be read, when the respective dials have been rotated.

In the operation of the device hereinbefore described, an automobile may be driven over the treadway 1, the vehicle moving at right angles to the longitudinal axis of the treadway. The flanges 10 and 13 are so disposed that when the vehicle moves over the treadway, the opposite wheels of the vehicle roll over said flanges. If the alignment of the automobile wheels is ideal, pure rolling motion will take place between the surfaces of the tires and the flanges. If, however, the wheel alignment of the vehicle is faulty, the rolling motion will be accompanied by a lateral sliding movement of the tires. Such movement of the tires, in the normal operation of the automobile, rapidly leads to excessive tire wear and also makes steering of the vehicle difficult. Accordingly, when employing the present invention, the pointer 49 is coincident with the zero mark on scale 31 and the indexes 68 and 69 are respectively coincident with the zero marks on the dials 33 and 34. When the vehicle is driven over the treadway 1 and lateral sliding movement of the tires accompanies the rolling movement thereof, such sliding movement moves the flanges 10 and 13 longitudinally within the respective slots 7 and 8. The respective plates 9 and 12 are thus moved, the movement being accommodated and facilitated by the rollers 15, 19, 21 and 24. Hence, the connecting bars 25 and 27 will be moved along the length of their respective axis.

As has been hereinbefore described, such movement imparts a rocking movement to the bell crank levers 38 and 39 which latter act upon the transverse lever 42. If both flanges move inwardly toward each other or both flanges move outwardly away from each other, bars 25 and 27 will move in opposite directions and, hence, the bell crank levers 38 and 39 will move in opposite angular directions and, hence, lever 42 will be rocked about its connection to rod 45. Dial 33 will then indicate the movement of flange 10 and dial 34 will indicate the movement of flange 13. Therefore, the degree of sidewise movement of the respective tires of the vehicle will be indicated. If the rocking movement of the bell crank lever 38 equals the rocking movement of the bell crank lever 39, the central position of lever 42 will be unaltered and, hence, pointer 49 will indicate zero on scale 31. If, however, said bell crank levers rock throughout different angles, the central portion of lever 42 will move upwardly or downwardly a distance proportional to the differential of the bell crank's movements.

If both flanges 10 and 13 move in the same direction, both bell crank levers 38 and 39 will rock in the same angular direction, dials 33 and 34 will still indicate the individual movements of the respective flanges, but pointer 49 will indicate the summation of said movements. Hence, from dial 31 an operator may note the tendency for improperly aligned wheels to move the vehicle progressively to the right or left and the dials 33 and 34 will indicate each wheel's contribution to such tendency. An accurate concept of the alignment characteristics of the opposite wheels of a vehicle may thus be observed.

I claim as my invention:

1. An automotive vehicle wheel alignment gauge which comprises in combination, a treadway over which an automotive vehicle may be driven in a predetermined direction, a pair of flanges carried upon said treadway and movable at substantially right-angles to the path of movement of said vehicle and over which the opposite tires of said vehicle respectively move, a pair of indicating devices, a motion-transmitting lever positioned for rotational and translatory movement, means connecting each end of said lever to a separate indicating device, means connecting each flange to a respective end of said lever to rotate said lever and separately measure the movement of each flange upon a respective indicating device, a third indicating device, and pivotal means connecting said third indicating device to a substantially central portion of said motion-transmitting lever and movable in response to translatory movement of said lever to measure the composite movement of said lever occasioned by the movement of said flanges.

2. An automotive vehicle wheel alignment gauge which comprises in combination, a treadway over which an automotive vehicle may be driven in a predetermined direction, a pair of axially-spaced aligned flanges carried upon said treadway and movable at substantially right-angles to the path of movement of said vehicle and over which the opposite tires of said vehicle respectively move, a pair of indicating devices, a motion-transmitting lever, means connecting each end of said lever to a separate indicating device, means connecting each flange to a respective end of said lever to rock said lever and separately measure the movement of each flange upon a respective indicating device, a third indicating device, and pivotal means connecting said third indicating device to a substantially central portion of said motion-transmitting lever to form a fulcrum for said lever and responsive to translatory movement of said lever to measure the composite movement of said lever occasioned by the movement of said flanges.

3. An automotive vehicle wheel alignment gauge which comprises in combination, a treadway over which an automotive vehicle may be driven in a predetermined direction, a pair of axially-spaced aligned flanges carried upon said treadway and constrained for movement only axially at substantially right-angles to the path of movement of said vehicle and over which the opposite tires of said vehicle respectively move, a pair of indicating devices, a motion-transmitting lever positioned for rotational and translatory movement, means connecting each end of said lever to a separate indicating device, a pair of bell crank levers connected to opposite end portions of said motion-transmitting lever, means connecting each flange to a respective bell crank lever to rotate said motion-transmitting lever and separately measure the movement of each flange upon a respective indicating device, a third indicating device, and means pivotally connecting said third indicating device to a substantially central portion of said motion-transmitting lever to form a fulcrum for said lever and movable in response to translatory movement of said lever to measure the composite movement of said lever occasioned by the movement of said flanges.

4. An automotive vehicle wheel alignment gauge which comprises in combination, an elongated treadway over which an automotive vehicle may be driven in a direction transverse to said treadway, a pair of axially-spaced aligned flanges carried upon said treadway and movable longitudinally with respect to said treadway and over which the opposite tires of said vehicle respectively move, a tower disposed at an end portion of said treadway, a pair of indicating devices carried on said tower, a motion transmitting lever positioned at the juncture of said tower and said treadway, a fulcrum about which said lever rocks, said lever and fulcrum being movable vertically with respect to said tower, means connecting each end of said lever to a separate indicating device whereby rocking of said lever actuates said indicating devices, means connecting each flange to a respective end of said lever to rock said lever and separately measure the movement of each flange upon a respective indicating device, a third indicating device carried on said tower, and means carried within said tower connected to said third indicating device and pivotally connected to a substantially central portion of said motion-transmitting lever forming said fulcrum for said lever and responsive to vertical translatory movement of said fulcrum.

References Cited in the file of this patent

UNITED STATES PATENTS

| | | |
|---|---|---|
| 1,890,218 | Duby | Dec. 6, 1932 |
| 2,261,342 | Darton | Nov. 4, 1941 |